United States Patent [19]
Chamussy et al.

[11] Patent Number: 5,460,037
[45] Date of Patent: Oct. 24, 1995

[54] DEVICE FOR MONITORING AND COLD CHECKING OF INFLATION PRESSURE OF VEHICLE TIRES

[75] Inventors: Jean-Francois Chamussy, Blois; Jean-Pierre Francois, Romagnat, both of France

[73] Assignee: Compagnie Generale des Etablissements Michelin-Michelin & Cie, Clermont-Ferrand Cedex, France

[21] Appl. No.: 265,017

[22] Filed: Jun. 24, 1994

[30] Foreign Application Priority Data

Jun. 25, 1993 [FR] France ................. 93 07882

[51] Int. Cl.⁶ ........................................... B60C 23/02
[52] U.S. Cl. ...................... 73/146.3; 73/146.2; 73/146.5
[58] Field of Search ................. 73/143.2, 143.3, 73/143.5

[56] References Cited

U.S. PATENT DOCUMENTS

| | | |
|---|---|---|
| 4,067,235 | 1/1978 | Markland et al. ............ 73/146.5 |
| 4,574,267 | 3/1986 | Jones ............................ 73/146.2 |
| 5,037,322 | 8/1991 | Adams et al. . | 
| 5,083,457 | 1/1992 | Schultz . |
| 5,231,872 | 8/1993 | Bowler et al. . |
| 5,248,957 | 9/1993 | Walker et al. ................. 73/146.2 |

FOREIGN PATENT DOCUMENTS 0284895 10/1988 European Pat. Off. .

*Primary Examiner*—Richard Chilcot
*Assistant Examiner*—Jewel V. Artis
*Attorney, Agent, or Firm*—Oblon, Spivak, McClelland, Maier, & Neustadt

[57] ABSTRACT

A device for monitoring and "cold" checking of an inflation pressure of tires of a vehicle. The device monitors the inflation pressure of the tires with a central processing unit, as well as a socket placed on the vehicle, connected to the central processing unit and which is able to be connected to a portable checking box. This portable checking box can supply power to and communicate with the central processing unit, to thereby check the pressure of the tires "cold" from outside of the vehicle.

12 Claims, 1 Drawing Sheet

DEVICE FOR MONITORING AND COLD CHECKING OF INFLATION PRESSURE OF VEHICLE TIRES

BACKGROUND OF THE INVENTION

1. Field of the Invention

The present invention relates to the monitoring of the cold inflation pressure of the tires of vehicles, and particularly the use of devices for monitoring tires for this purpose.

2. Background of the Invention

Monitoring of the "cold" inflation pressure of tires of a vehicle is an operation which must be performed regularly for a good utilization of the vehicles. The term "vehicle" here is meant as identifying an autonomous traveling unit, passenger vehicle, tractor or heavy trailer, motorcycle, etc.

This operation includes measuring "cold", i.e., at least after several hours stopped, the pressure of the tires and in verifying that this pressure is in accordance with the indications of the tire manufacturer taking into consideration, particularly in heavy trucks, their conditions of use.

This simple operation can prove tedious when it relates to fleets of heavy truck vehicles of several tens or hundreds of vehicles, tractors and trailers.

The tire pressure monitoring devices are in full development and it appears desirable to be able to use them for this purpose of regular verification.

A type of device for monitoring tires, the Michelin Tire Monitor or M.T.M of Michelin, is a centralized device that features one sensor per tire and an electric connection between these sensors and a central computer that supplies the sensors with power and analyzes the data that these sensors transmit. The computer is itself connected to a display placed in the cab of the vehicle. This device continuously measures, on the application of a voltage to it, when stopped and while driving, the inflation pressures of the various tires.

Such a device can entirely make possible the cold verification of the tires of the vehicle on which it is equipped. However, this verification necessitates entering the cab of the vehicle and switching on the power to activate the device for monitoring the tires.

SUMMARY OF THE INVENTION

Accordingly, one object of the present invention is to provide a novel tire pressure monitoring device that makes it possible to perform, under excellent conditions, regular cold verification of tires without it being necessary to enter the cab and switch on the power, or to hitch trailers.

In the device for monitoring as well as checking of the cold inflation pressure of the tires of a vehicle according to the present invention, a unit measures the inflation pressure of each tire. A means is provided for transmitting the measurements to a central processing unit and the central processing unit is able to analyze the measurements with reference to ranges of stored values and thus to detect abnormal values. A means is also provided for transmitting an alarm to the driver of the vehicle. An autonomous means is also provided which supplies the central processing unit with power and which communicates with the central processing unit, from outside the vehicle.

The autonomous means for supplying the central processing unit with power and for communicating with the central processing unit may also comprise a portable checking box, equipped with an autonomous electric supply that can be connected to a socket placed on the vehicle and connected to the central processing unit. Also, the ranges of recommended values of cold inflation pressure for each tire of the vehicle that are stored in the central processing unit can be modified with the portable checking box.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
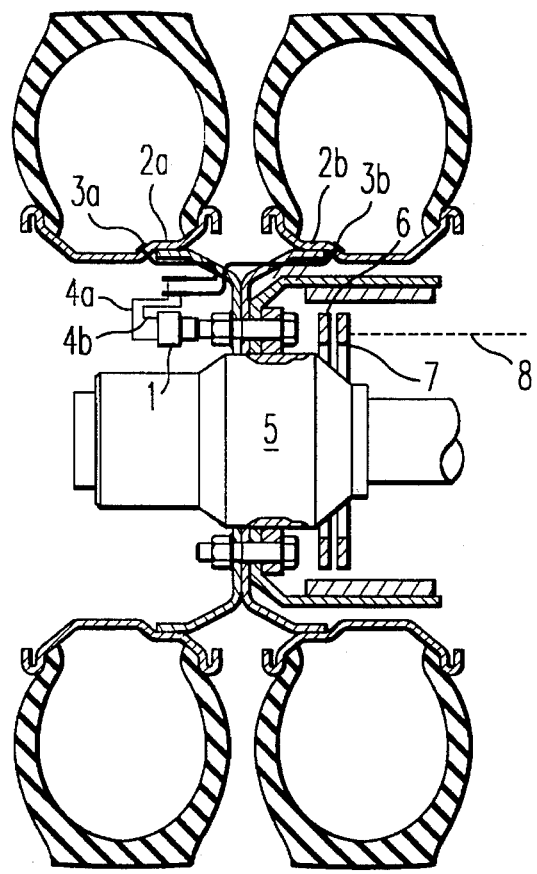
FIG. 1 is a view in partial section of a set of dual wheels, their hub and the brake drum, a section passing through the axis of the wheels and the axis of a modified mounting bolt.

Referring now to the drawings, wherein like reference numerals designate identical or corresponding parts throughout the several views, and more particularly to FIG. 1, there is illustrated the installation of a device of the present invention for monitoring the inflation pressures of tires for, as an example, a road vehicle on a rear axle wheel of a heavy truck tractor.

A pressure sensor 1 is fastened to an end of one of the fastening bolts 5 of the dual wheels 2a and 2b, this sensor 1 having two measuring paths since it equips a set of two dual wheels 2a, 2b. Sensor 1 is connected to inflation valves 3a and 3b by pneumatic connections 4a and 4b. The sensor 1 is also connected to a central processing unit 9 (see FIG. 2) by an electrical connection. The electrical connection includes electric conductors passing through bolt 5 up to a mobile antenna 6, an inductive coupling element composed of the mobile antenna 6 and a stationary antenna 7, and an electric connection between the stationary antenna 7 and central processing unit 9 which may use the wiring harness 8 of the vehicle.

Figure 2:
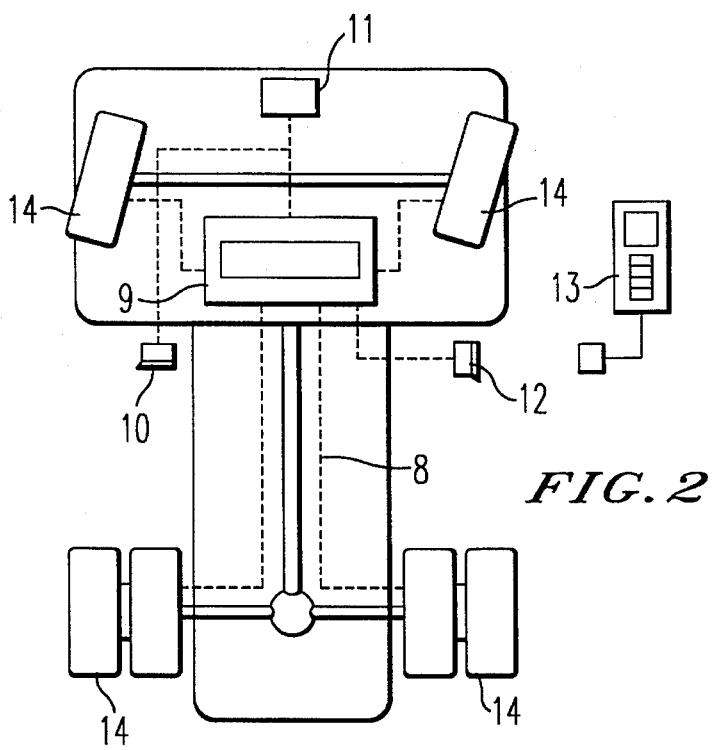
FIG. 2 is an installation diagram in accordance with the present invention applied to a heavy truck tractor.

FIG. 2 exhibits a general installation diagram of the monitoring device of the present invention on a heavy truck tractor, as one example. Each wheel of the tractor is equipped as has just been described in FIG. 1, and the device further also includes a central processing unit 9. In the case of the trailers, this central processing unit 9 is supplied with power by the tractor vehicle by a standardized socket 10 connecting the wiring harness of the trailer to that of the tractor. An alarm 11 for the driver is connected to the central processing unit 9. Also, a socket 12 is placed on the side of the vehicle and is connected to central processing unit 9. This socket 12 makes possible a diagnosis of the operation of central processing unit 9 by means of a diagnostics case as well as a checking of the cold inflation pressure of the tires by means of a portable checking box 13.

Portable checking box 13 may be connected into socket 12. Portable checking box 13 is an information processing aid that includes an electric supply for supplying power to the central processing unit 9. Portable checking box 13 can also communicate with, i.e., exchange data with and give instructions to, the central processing unit 9.

Portable checking box 13 can thus interrogate the central processing unit 9 to determine whether or not the cold inflation pressures of all the tires 14 of the vehicle are in conformity with the manufacturer's set values for use. In case of nonconformity, the portable checking box 13 can identify the tire or tires 14 which are in nonconformity. On the other hand, portable checking box 13 has an input and can also modify the ranges of the recommended cold inflation pressure values that are stored in the central processing unit 9, as a function of the particular conditions of use of the tires 14.

Consequently, the use of this system of the present invention for monitoring the tires 14 brings a remarkable gain in speed and reliability to assure this checking operation of the cold inflation pressures of the tires 14.

Obviously, numerous modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. A device for monitoring an inflation pressure of tires of a stopped vehicle comprising:

means for measuring the inflation pressure of each tire;

a central processing unit for analyzing the measurements with reference to ranges of stored values to thus detect abnormal pressure values;

means for transmitting said measurements to said central processing unit;

means for transmitting an alarm to the driver of the vehicle;

autonomous means for supplying said central processing unit with power and for communicating with the central processing unit, from outside the stopped vehicle, for thereby monitoring the inflation pressure of each of the tires from outside the stopped vehicle.

2. The device for monitoring an inflation pressure of tires of a stopped vehicle according to claim 1, wherein the autonomous means for supplying the central processing unit with power and for communicating with the central processing means comprises a portable checking box, equipped with an autonomous electric supply means, that can be connected to a socket placed on the vehicle and connected to said central processing unit.

3. The device for monitoring an inflation pressure of the tires of a stopped vehicle according to claim 1, wherein the ranges of stored values stored in the central processing unit can be modified by the portable checking box.

4. The device for monitoring inflation pressure of the tires of a stopped vehicle according to claim 2, wherein the ranges of stored values stored in the central processing unit can be modified by the portable checking box.

5. A device for monitoring an inflation pressure of tires of a stopped vehicle comprising:

means for measuring the inflation pressure of each tire;

a central processing means for analyzing the measured inflation pressures in comparison to stored inflation pressure values, to generate analyzed data;

an autonomous means for supplying power to the central processing means and for receiving the analyzed data from the central processing means, from outside of the stopped vehicle, for thereby monitoring the inflation pressure of each of the tires from outside the stopped vehicle.

6. The device according to claim 5, further comprising an alarm for issuing a warning signal if an abnormal value is measured for the inflation pressure of at least one tire.

7. The device according to claim 5, wherein the autonomous means further includes a control for modifying the stored inflation pressure values.

8. The device according to claim 6, wherein the autonomous means further includes a control for modifying the stored inflation pressure values.

9. A device for monitoring an inflation pressure of tires of a stopped vehicle comprising:

a measuring unit measuring the inflation pressure of each tire;

a central processing unit analyzing the measured inflation pressures in comparison to stored inflation pressure values, to generate analyzed data;

an autonomous unit supplying power to the central processing unit and receiving the analyzed data from the central processing unit, from outside of the stopped vehicle, for thereby monitoring the inflation pressure of each of the tires from outside the stopped vehicle.

10. The device according to claim 9, further comprising an alarm issuing a warning signal if an abnormal value is measured for the inflation pressure of at least one tire.

11. The device according to claim 9, wherein the automonous unit further includes a control for modifying the stored inflation pressure values.

12. The device according to claim 10, wherein the automonous unit further includes a control for modifying the stored inflation pressure values.

\* \* \* \* \*